US007725449B2

(12) United States Patent
Naam

(10) Patent No.: US 7,725,449 B2
(45) Date of Patent: May 25, 2010

(54) SYSTEM AND METHOD FOR CUSTOMIZATION OF SEARCH RESULTS

(75) Inventor: Ramez Naam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 11/001,134

(22) Filed: Dec. 2, 2004

(65) Prior Publication Data

US 2006/0122968 A1 Jun. 8, 2006

(51) Int. Cl.
*G06F 7/00* (2006.01)
*G06F 17/30* (2006.01)

(52) U.S. Cl. .............................. 707/706; 707/999.003; 715/237

(58) Field of Classification Search ..................... 707/3, 707/4, 102
See application file for complete search history.

(56) References Cited

U.S. PATENT DOCUMENTS

| | | | | |
|---|---|---|---|---|
| 6,363,398 | B1 * | 3/2002 | Andersen | 707/103 R |
| 6,385,602 | B1 * | 5/2002 | Tso et al. | 707/3 |
| 6,601,061 | B1 * | 7/2003 | Holt et al. | 707/3 |
| 2002/0188596 | A1 | 12/2002 | Tanaka | 707/1 |
| 2004/0146199 | A1 * | 7/2004 | Berkner et al. | 382/176 |
| 2005/0060290 | A1 * | 3/2005 | Herscovici et al. | 707/3 |
| 2005/0149502 | A1 * | 7/2005 | McSherry | 707/3 |
| 2006/0004716 | A1 * | 1/2006 | Hurst-Hiller et al. | 707/3 |

OTHER PUBLICATIONS

Poremsky, D. Google and Other Search Engines: Visual Quickstart Guide [online]. Peachpit Press, 2004 [retrieved on Apr. 13, 2007]. Retrieved from the Internet: < URL: http://proquest.safaribooksonline.com/0321246144 > Chapter 11.*
Calishain, T and Dornfest, R. Google Hacks [online]. O'Reilly & Associates, Inc., 2003 [retrieved on Apr. 13, 2007]. Retrieved from the Internet< URL: http://proquest.safaribooksonline.com/0596004478 > Chapters 3.1 and 3.3.*
Phantom Version 2.2.1 QuickStart Guide. Customizing Search and Results Pages [online]. AKTIV Software Corporation, 2000 [retrieved on Apr. 13, 2007]. Retrieved from the Internet: <URL:www.phantomsearch.com/usersguide/QS10Customizing.htm>.*
Anonymous: "Customizing Search Result List Items" WWW.SEARCHTOOLS.COM [Online] Oct. 30, 2004, pp. 1-4, XP002394198 Retrieved from the Internet: URL:http://web.archive.org/web/20041030082447/http://www.searchtools.com/analysis/remotesearch/items.html> [retrieved on Aug. 3, 2006].

(Continued)

*Primary Examiner*—Mohammad Ali
*Assistant Examiner*—Angelica Ruiz
(74) *Attorney, Agent, or Firm*—Shook Hardy & Bacon, LLP

(57) ABSTRACT

A system and method are provided for customizing search result descriptions for results returned by a search engine. The search result descriptions may be obtained through a search over a computer network. The system includes a search result description request component for enabling selection of particular data for retrieval by the search engine. The system additionally includes a search result description generator for retrieving and returning the requested data. The system also includes a search result description renderer for displaying search result descriptions in a selected manner.

18 Claims, 5 Drawing Sheets

OTHER PUBLICATIONS

Anonymous: "How to Add Custom Fields to dtSearch Web Search Results" [Online] Apr. 18, 2001, pp. 1-2, XP002394199 Retrieved from the Internet: URL:http://www.dtsearch2.com/faq/dts0158.htm> [retrieved on Aug. 3, 2006].

Anonymous: "How to Get Field Data in Search Results" [Online] Nov. 9, 2004, pp. 1-3, XP0023944200 Retrieved from the Internet: URL:http:/www.dtsearch2.com/faq/dts0109.htm> [retrieved on Aug. 3, 2006].

Anonymous: "dtSearch Web Quick Start" [Online] Apr. 21, 2003, pp. 1-3, XP002394201 Retrieved from the Internet: URL:http://www.dtsearch2.com/faq/dts0162.htm> [retrieved on Aug. 3, 2006].

European Search Report dated Aug. 22, 2006 for related European Patent Application No. 05110305.9.

* cited by examiner

SYSTEM AND METHOD FOR CUSTOMIZATION OF SEARCH RESULTS

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to customization of search result descriptions. In particular, embodiments relate to user or developer control of displayed information upon execution of a computerized search over a network.

BACKGROUND OF THE INVENTION

Through the Internet and other networks, users have gained access to large amounts of information distributed over a large number of computers. Various techniques are available for facilitating user access to desired information. Known techniques typically include user implementation of a search engine in order to locate desired information.

Currently, when implementing a search engine, a user enters one or more keywords and receives a set of results. Each result includes a description that has a predetermined set of components. Typically, the description includes a portion of a document title, a portion of a document body, and a relevant universal resource locator (URL) for each web page result returned. In a few specific instances, such as a web shopping search, a hard coded set of fields is returned. Such fields may include price or model number fields.

Search techniques are used for many different activities by end users and increasingly by developers. However, the results that are returned are wholly under the control of the search engine as predetermined by hard coded rules and cannot be controlled by the user or developer. While the uses of a search engine vary, the interface is locked.

No search system currently exists for allowing a user to control aspects of returned search results, including which portion of the body the description is pulled from, the length of the description, or what other attributes of the document or structured data within the document may be returned as a portion of the result. Furthermore, no currently known search system enables users or developers to specify elements of the user interface that display the description. Furthermore, after receiving search results, developers are unable to programmatically render search results in a desired format.

Accordingly, a system and method are needed for allowing customization of web search result descriptions by consumers including users and developers. A solution can be created by leveraging existing technologies such as XML, HTML, metatags, and indexing. By creating such a solution, a search platform can be created that is capable of expansion and modification. Such a system would improve the search experience for consumers of search results including users and developers.

BRIEF SUMMARY OF THE INVENTION

Embodiments of the present invention are directed to a method for customizing search result descriptions returned by a search engine. The search result descriptions are obtained through a search over a computer network. The method includes implementing a search result description request component to select at least one component of each search result description for return by a search engine. The method additionally includes sending a search result description request to the search engine encoded in a search query and processing the search query by implementing a search result description generator and returning the requested search result descriptions.

In an additional aspect, a system is provided for customizing search result descriptions for results returned by a search engine. The search result descriptions are obtained through a search over a computer network. The system includes a search result description request component for enabling selection of particular data for retrieval by the search engine. The system additionally includes a search result description generator for retrieving and returning the requested data and a search result description renderer for displaying search result descriptions in a selected manner.

BRIEF DESCRIPTION OF THE DRAWINGS

The present invention is described in detail below with reference to the attached drawings figures, wherein.

DETAILED DESCRIPTION OF THE INVENTION

I. System Overview

Embodiments of the invention include a method and system for customizing search result descriptions. The disclosed system and method provide the capability for controlling which portions of document are returned to a user or developer. Similarly to a database system, the disclosed system enables a developer or user to specify which "columns" should be returned. Information discernable by a search engine that requests such information as a title, a URL, a document size, a predetermined document portion, a domain where the document is hosted, or a date of the document may be encoded in a query forwarded to the search engine. Accordingly, a user or developer is able to control display of attributes of the document. In further embodiments, a user may control display of structured data stored within the document, such as Meta-Tags, XML, resource description framework (RDF), fonts, colors, styles, or the order of the fields of the description. Furthermore, the system and method provide the capability for programmatic handling of search results, for instance through an API, rather than through the user interface.

Figure 1:
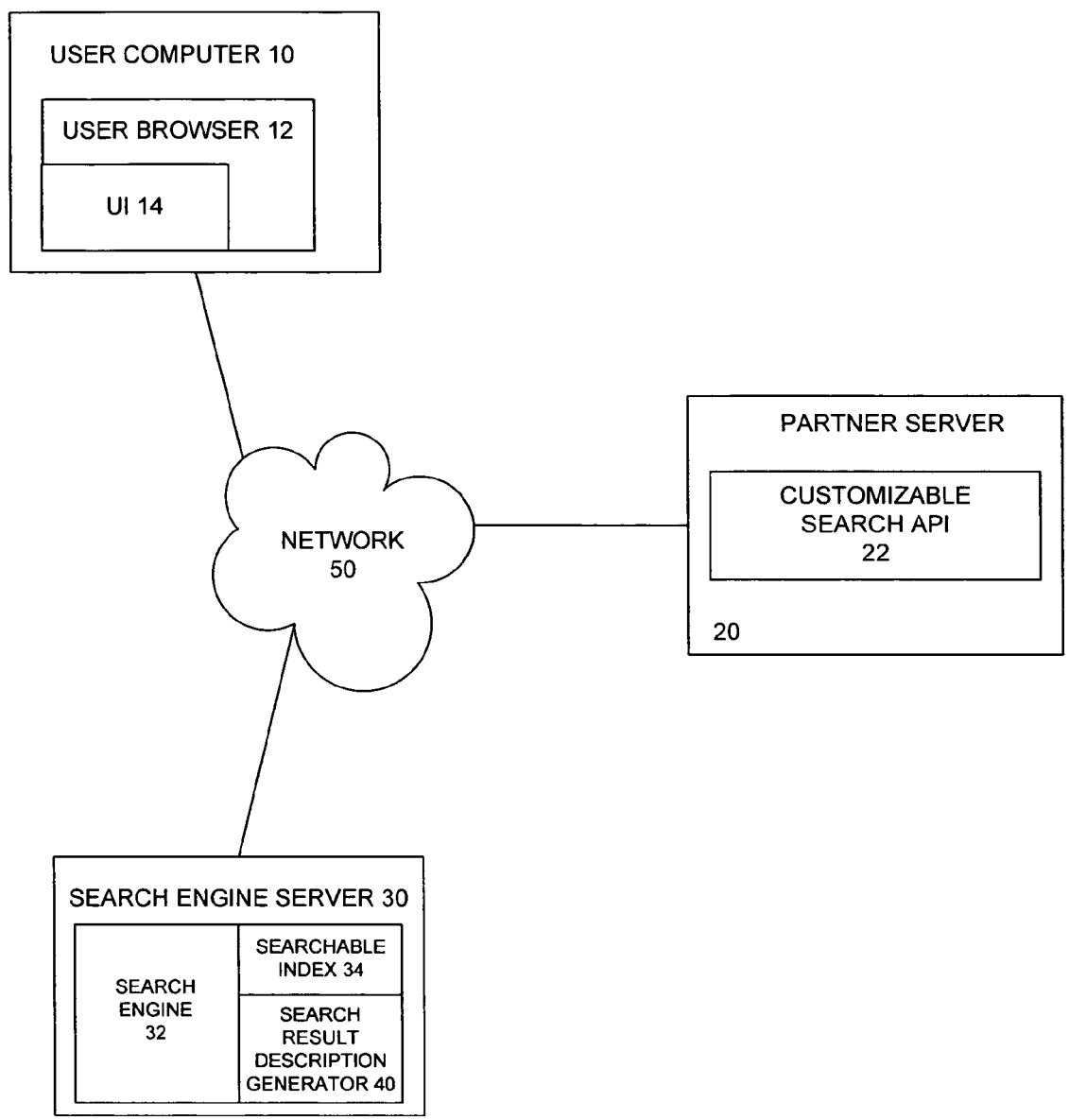
FIG. 1 is a block diagram illustrating an overview of a system in accordance with an embodiment of the invention.

FIG. 1 illustrates a system overview including a user computer 10 having a user browser 12 accessible through a user interface (UI) 14. The user computer 10 may be connected over a network 50 with a partner server 20 and a search engine server 30. The partner server 20 may include a customizable search application program interface (API) 22 for customizing search results. The search engine server 30 may include a search engine 32, a searchable index 34, and a search result description generator 40. Other components that are not shown may also be included.

In operation, a developer may customize search result descriptions by implementing the customizable search API 22 of the partner server 20. A search engine 32 may traverse a searchable index 34 and implement a search result description generator 40 to generate results in accordance with the settings implemented by the customizable search API 22. In operation, the user submits a query through the user browser 12. Based on the parameters required by the customizable search API 22, the search engine server 30 processes the query and returns results. Details of the customizable search API 22 and search result description generator 40 will be further described below with reference to FIGS. 2 and 3.

II. Exemplary Operating Environment

Figure 5:
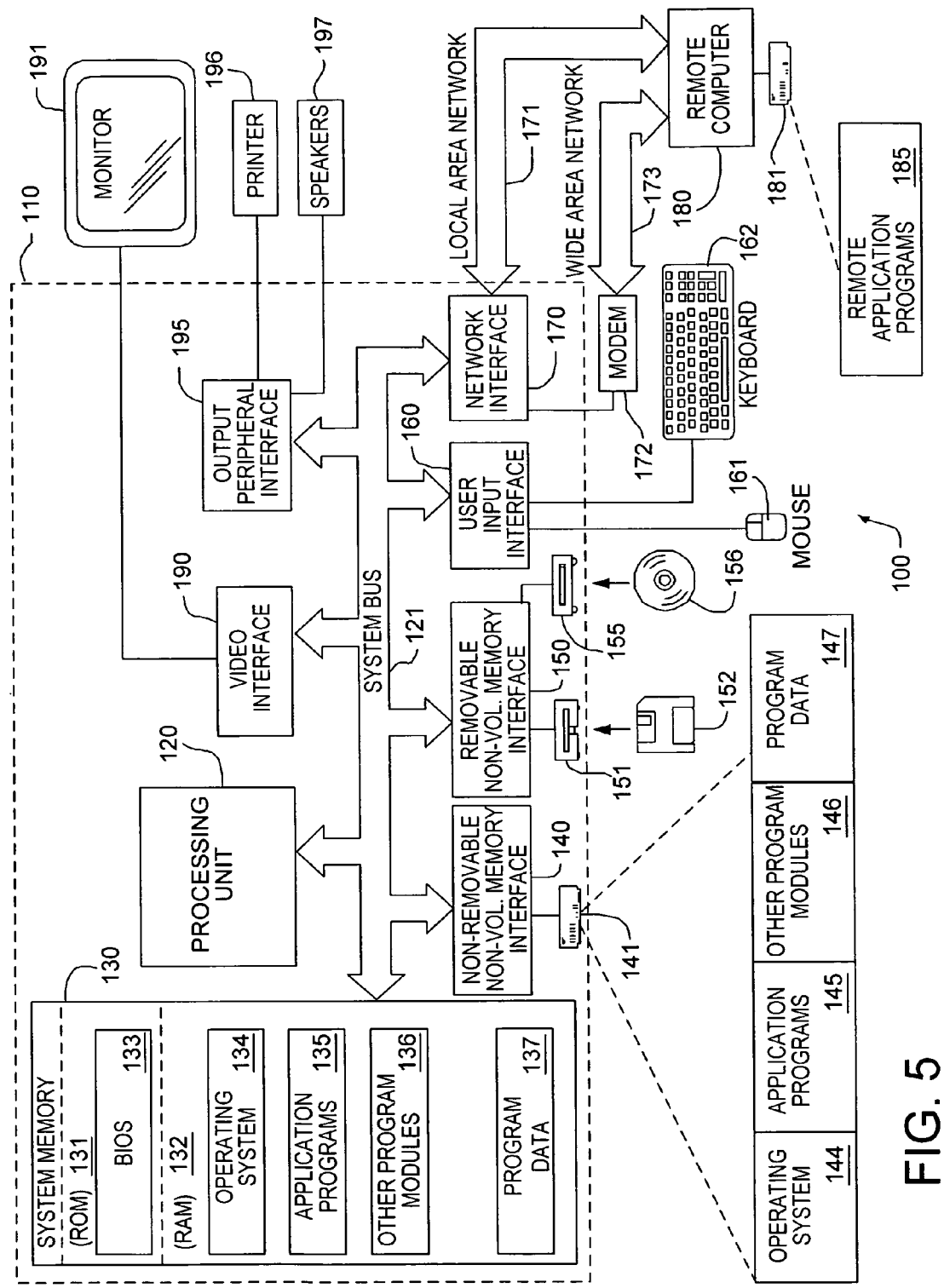
FIG. 5 is a block diagram illustrating a computerized environment in which embodiments of the invention may be implemented.

FIG. 5 illustrates an example of a suitable computing system environment 100 on which the system and method for customizing search result descriptions may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 5, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

Figure 2:
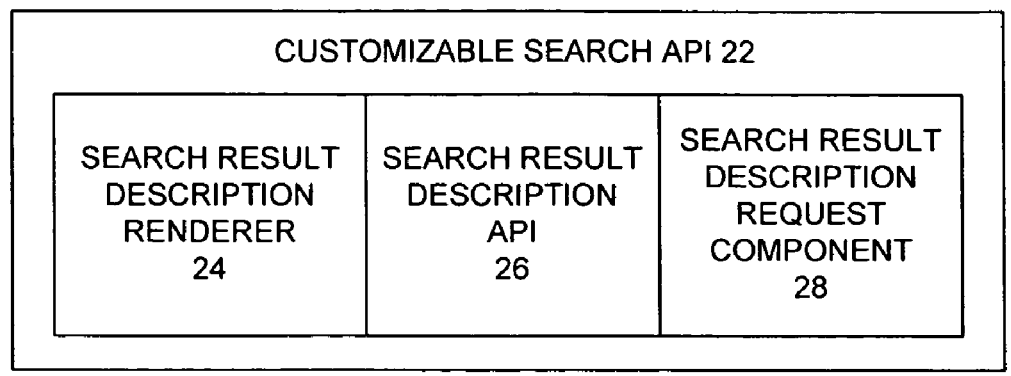
FIG. 2 is a block diagram illustrating components of a customizable search API in accordance with an embodiment of the invention.

As set forth above, FIG. 2 illustrates a customizable search API 22 in accordance with an embodiment of the invention. The customizable search API 22 may include a search result description renderer 24, a search result description API 26, and a search result description request component 28.

The search result description renderer 24 may display the search results to end users of the search site operated by the partner server 20. Although the search result description renderer 24 is shown as a portion of the customizable search API 22 on the partner server 20, the search result description renderer 24 could also be disposed in alternative locations. The search result description renderer 24 can be instructed to display descriptions with different fonts, colors, or styles, to order the fields of the description in various ways for display on the UI 14. For example, the search result description renderer 24 may change spacing or alignment of descriptions and otherwise modify the results as instructed by the developer.

The search result description API 26 is a subset of the overall search API that allows a developer to programmatically retrieve and inspect search results. The result description API 26 allows the developer to view the structured data and attributes as distinct programmatic attributes of each search result.

The search result description request component 28 enables the user or developer to specify what data should be retrieved in building the search result display for each retrieved document. The search result description request component 28 may cause information to be encoded within the user query string. The search result description request component 28 can also be exposed via user interface elements (e.g. advanced search) or programmatically within a search API.

Figure 3:
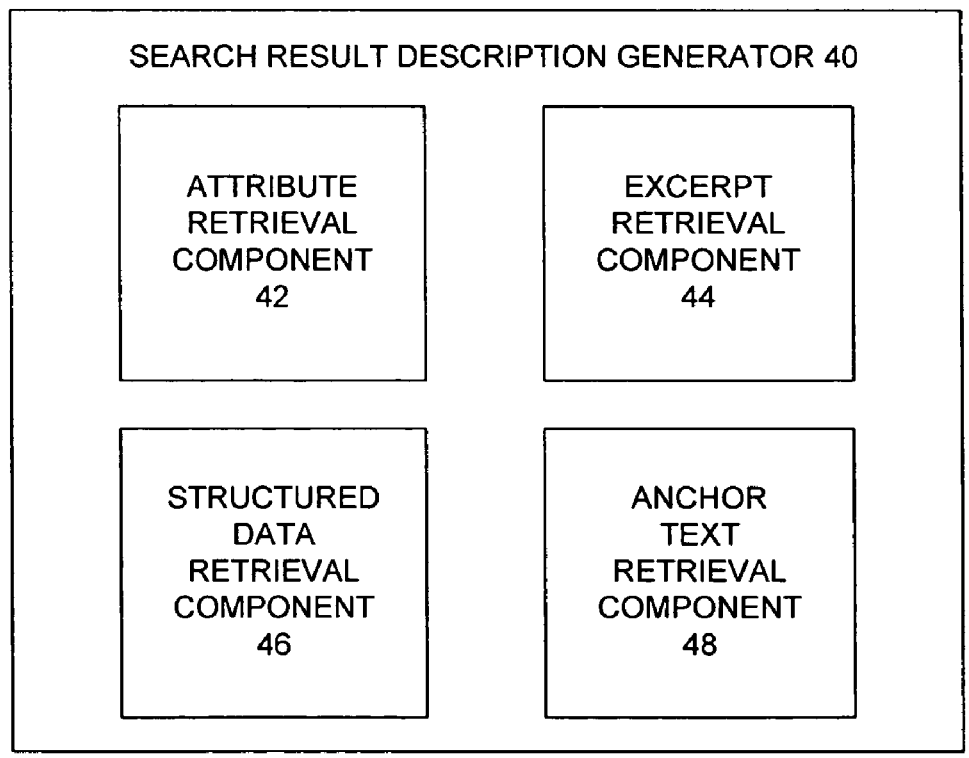
FIG. 3 is a block diagram illustrating a search result description generator in accordance with an embodiment of the invention.

The above-described components operate in conjunction with the search engine server 30 to request and generate search results. As shown in FIG. 3, the search result description generator 40 on the search engine server 30 may include an attribute retrieval component 42, excerpt retrieval component 44, a structured data retrieval component 46, and an anchor text retrieval component 48.

In currently known systems, a component analogous to the presently disclosed search result description generator 40 generates the description of a page, including its URL, title, and a snippet of its text. The presently disclosed search result description generator 40 expands upon this concept by allowing retrieval of selected alternative or additional information. These components of the search result description generator 40 may be configured to operate in response to requests made through the customized search API 22 described above.

The attribute retrieval component 42 enables retrieval of a programmable set of data pulled from attributes of the document, such as its size, date created, date changed, domain that it is hosted on or other trackable attributes.

The structured data retrieval component 46 allows retrieval of structured data stored within the document. The structured data may include metatags, XML, RDF, or other types of structured data. The structured data retrieval component 46 may also search for other types of data in html that are not normally visible. For example, an informational web site such as a news site may store various types of documents. The documents may include reference documents, coding examples, general overviews, tips and tricks, and other types of documents. The type of document is generally stored as a metatag. For instance, a "metatype" may be set equal to "example" or "reference". Metatags may also be used to indicate product and version. Thus a user request can be formulated to filter out the return of various products.

The excerpt retrieval component 44 facilitates retrieval of programmable excerpts from the body of the text, such as different lengths, different locations within the body, different numbers of distinct snippets, or snippets centered around specific words. The excerpt retrieval component 44 may also control links or number of different locations in the body of text that a word or set of words is centered on.

Finally, the anchor text retrieval component 48 retrieves anchor text of the document, or the text of links pointing to the document, with the same programming options as for the body of text within the document. The anchor text retrieval component 48 treats the anchor of link pointing to document as part of document and provides the ability pull information from an anchor tag data display.

The partner server 20 may be operated for any number of purposes. For example, the partner server 20 may be operated by a newspaper publisher. The newspaper publisher may provide access to a number of articles over the network. A web developer of the newspaper web site may want to have a query UI on the newspaper web site to allow users to issue a query. The user could request a search through UI 14 by entering keywords. A developer could set the results to return information such as an author or date or other information. The customizable search API 22 may send a URL to the search engine server 20 that requests the specified results and further instructs the search engine server 30 to display the results in a specific format, such as in consecutive columns.

In additional embodiments of the invention, a website may receive pre-determined data from the search engine server 20 as requested and may be responsible for rendering the received data using the customizable search API 22. The website may receive the data and select the data to render through the customizable search API 22 and in what format to render it, for example in structured columns provided by the customizable search API 22.

Figure 4:
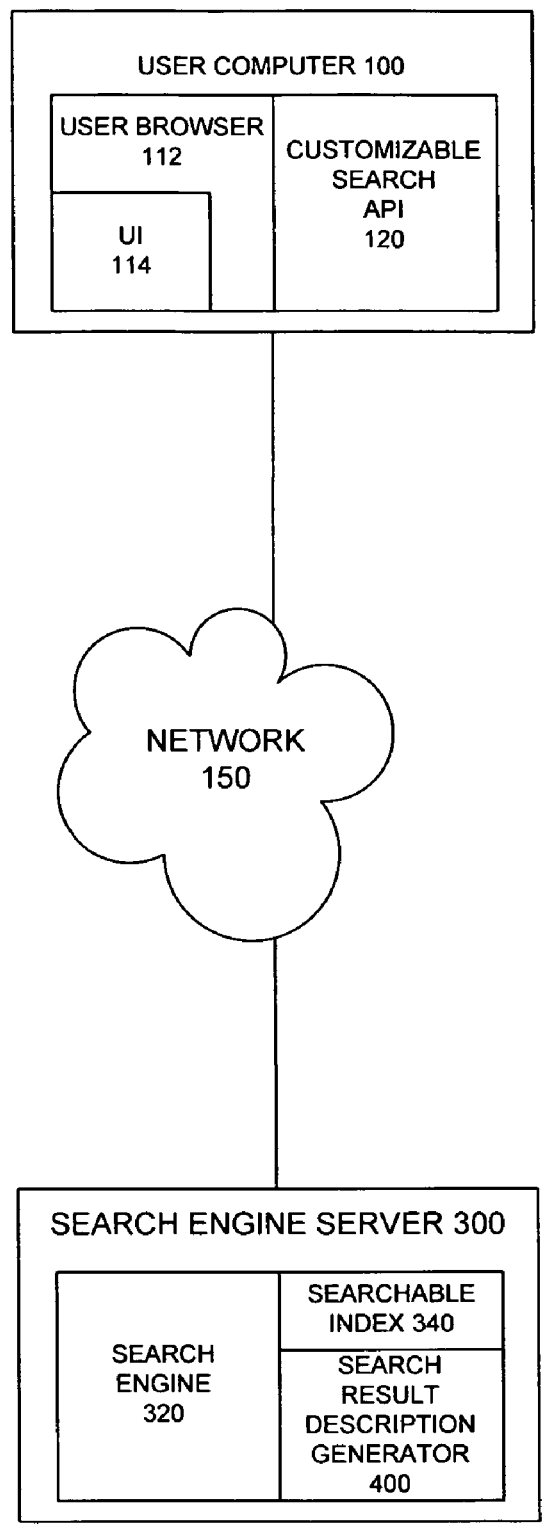
FIG. 4 is a block diagram illustrating an overview of a system in accordance with an alternative embodiment of the invention.

FIG. 4 illustrates an alternative embodiment of the invention. In FIG. 4, a user computer 100 may include a user browser 112 having a UI 114. The user computer 100 may also include a customizable search API 120. The user computer 100 may be connected over a network 150 with a search engine server 300. The search engine server 300 may include a search engine 320, a searchable index 340, and a search result description generator 400.

In the embodiment of FIG. 4, the user computer 100 implements the customizable search API 120 to selectively configure search result descriptions. The user may additionally selectively configure search result descriptions using the UI 114. The user computer 100 then communicates over the network 150 with the search engine server 300 in response to a user query entered through the UI 114. The search engine server 300 may then implement the search engine 320 to traverse the searchable index 34 and may generate results using the search result description generator 400. The search result description generator 400 may generate results in accordance with the user-selected preferences entered through the customizable search API 120. This embodiment eliminates the middle-tier shown in FIG. 1 and enables a user to select and render results directly from the search engine server 300. In this embodiment, the UI 114 may include components for simplifying a user's request for specific content and the rendering of that content.

Figure 6:
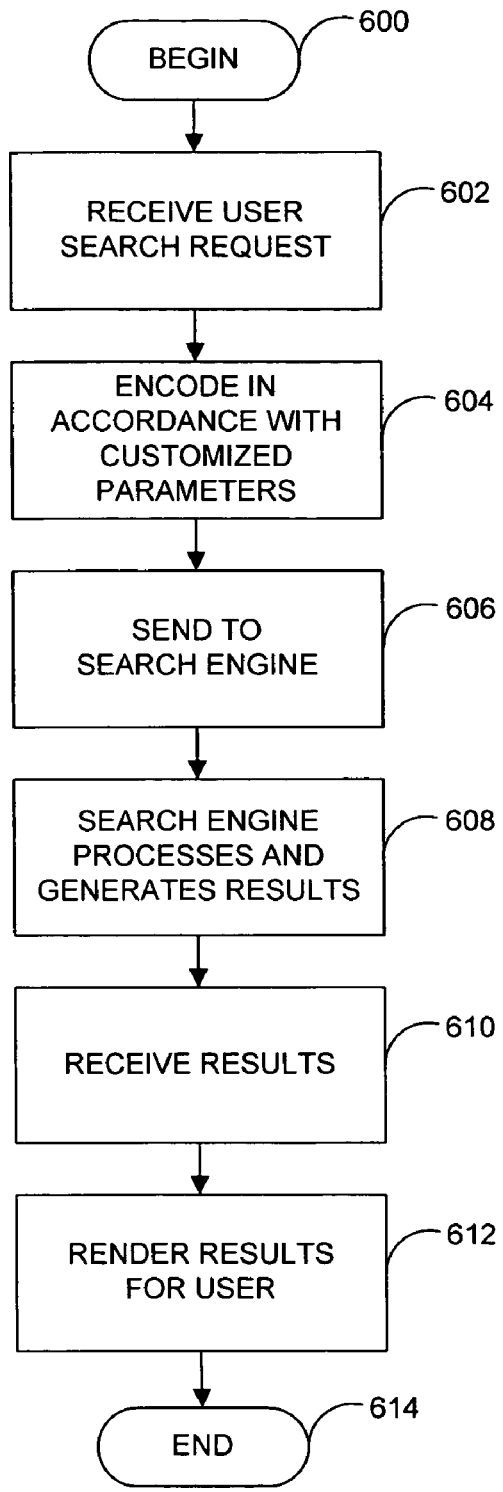
FIG. 6 is a flow chart illustrating a method for processing a query in accordance with an embodiment of the invention.

FIG. 6 illustrates a method for implementing the system of FIGS. 1-3 in accordance with an embodiment of the invention. The method begins in step 600 and the partner server 300 receives a user search request in step 602. In step 604, the partner server 300, through the efforts of a developer, encodes the query string in accordance with customized parameters selected through the customizable search result API 22. In step 606, the partner server 20 sends the request to the search engine server 30.

In step 608, the search engine 32 receives the request and processes the request by traversing the searchable index 34 and implementing the search result description generator 40 to generate results. The processing of the request in step 608 includes implementing the search engine 32 and the search result description generator 40. The search engine 32 may, for example, discern from a received query that a metatag has been requested. When the search result description generator 40 generates a description, it may open a cached copy of each relevant document and search for the metatag within each document identified in order to generate the description. Such a step would be performed by the structured data retrieval component 46. The other components of the search result description generator 40 will operate as needed in accordance with the descriptions provided above.

In step 610, the partner server 20 receives the generated results. In step 612, the partner server 20 implements the search result description renderer 24 to render search results for the user computer 10. The partner server 20 may also implement the search result description API 26 in order to further define rendering of retrieved results.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method for customizing a search-result description that is returned by a search engine and that describes an identified document, wherein the method is implemented with one or more of a processor and a computer storage medium and the method comprises:

using the processor to receive an input, which indicates information that is related to the identified document and that is retrieved by the search engine when responding to a search query, wherein the input is received using a search-result-description request component of a customizable-search application programming interface and wherein the information includes:

(a) attributes of the identified document, the attributes comprising at least one of document size, document creation date, document latest-change date, and a domain on which the identified document is hosted;

(b) structured data within the identified document, the structured data comprising at least one of Meta-tags, XML, or RDF;

(c) excerpts of text with specifiable features within the identified document, the specifiable features comprising at least one of excerpt length, excerpt location within the result returned by a search engine, and proximity of the excerpt to other text within a search-engine result; and (d) anchor text of hyperliniks that are in other documents and that point to the identified document;

in response to receiving the search query, using the processor to encode the search query to include a search-result-description request, which requests that the information be retrieved;

sending the search query together with the search-result description request to the search engine;

upon identification of the identified document, retrieving portions of the identified document that are specified by the information, wherein the identified document is identified from a plurality of documents and wherein the portions include at least one of:

(e) specified attributes of the identified document;

(f) specified structured data within the identified document;

(g) excerpts of text having specified features within the identified document; and (h) text of hyperlinks that are on other documents and that point to the identified document;

in response to receiving from the search engine the search-result description, using a search-result-description API to enable both viewing of the search-result description as a programmatic attribute and specifying elements of a user interface for displaying the search-result description; and causing display of the search-result description to an end user, wherein the search-result description is displayed in a specified format.

2. The method of claim 1, further comprising rendering the search-result description selectively by implementing a search-result-description renderer, wherein the search-result-description renderer is programmable using the customized-search application programming interface.

3. The method of claim 2, further comprising implementing the search-result-description request component and rendering the search-result description for a predetermined web site in a manner selected by a developer.

4. The method of claim 1, further comprising exposing the search-result-description request component to a user submitting the search query via user interface elements.

5. The method of claim 1, further comprising exposing the search-result-description request component programmatically within a customizable search API.

6. The method of claim 1, farther comprising implementing an attribute retrieval component that retrieves a programmable set of data pulled from attributes of the identified document.

7. The method of claim 6, wherein the attributes comprise document date and document domain.

8. The method of claim 1, further comprising implementing a structured-data retrieval component that retrieves structured data from documents.

9. The method of claim 1, further comprising implementing an excerpt retrieval component that facilitates retrieval of programmable excerpts from within text of the identified document.

10. The method of claim 1, further comprising implementing an anchor-text retrieval component to retrieve the text of the hyperliniks.

11. A computer readable storage medium comprising instructions for performing a method for customizing a search-result description that is returned by a search engine and that describes a document, the method comprising:
- receiving an input, which indicates particular data that is related to an identified document and that is usable to build the search-result description, wherein the particular data includes:
  - (a) attributes of the identified document, the attributes comprising at least one of document size, document creation date, document latest-change date, and a domain on which the identified document is hosted;
  - (b) structured data within the identified document, the structured data comprising at least one of Meta-tags, XML, or RDF;
  - (c) excerpts of text with specifiable features within the identified document, the specifiable features comprising at least one of excerpt length, excerpt location within the result returned by a search engine, and proximity of the excerpt to other text within a search-engine result; and
  - (d) anchor text of hyperlinks that are in other documents and that point to the identified document;
- in response to receiving a search query, which includes a search term, encoding the input into the search query and submitting the search query together with the input to a search engine;
- upon identification of the identified document based on the search term, retrieving a portion of the identified document that is specified by the input, wherein the identified document is identified from a plurality of documents and wherein the portion includes at least one of:
  - (e) specified attributes of the identified document
  - (f) specified structured data within the identified document;
  - (g) excerpts of text having specified features within the identified document; and
  - (h) text of hyperlinks that are on other documents and that point to the identified document; and
- implementing a search-result-description renderer for displaying the search-result description in a selected manner.

12. The computer readable storage medium of claim 11, wherein the method further comprises receiving from the search engine the search-result description and using a search-result-description API to enable both viewing of the search-result description as a programmatic attribute and specifying elements of a user interface for displaying the search-result description.

13. The computer readable storage medium of claim 11, wherein the method further comprises implementing user interface elements for exposing a search-result-description component.

14. The computer readable storage medium of claim 11, wherein the method further comprises implementing means for programmatically exposing a search-result-description request component within a customizable search API.

15. The computer readable storage medium of claim 11, wherein an attribute retrieval component retrieves a programmable set of data pulled from attributes of the identified document.

16. The computer readable storage medium of claim 11, wherein a structured-data retrieval component retrieves structured data from documents.

17. The computer readable storage medium of claim 11, wherein an anchor-text retrieval component retrieves the text of the hyperlinks.

18. A computer readable storage medium comprising instructions for performing a method for customizing a search-result description that is returned by a search engine and that describes a document the method comprising:
- receiving by way of a customizable-search API an input that describes particular data in the document, wherein the particular data is retrieved by the search engine and is usable to build the search-result description and wherein the particular data includes:
  - (a) attributes of the document, the attributes comprising at least one of document size, document creation date, document latest-change date, and domain on which the document is hosted;
  - (b) structured data within the document, the structured data comprising at least one of Meta-tags, XML, or RDF;
  - (c) excerpts of text with specifiable features within the document, the specifiable features comprising at least one of excerpt length, excerpt location within the result returned by a search engine, and proximity of the excerpt to other text within the result returned by a search engine; and
  - (d) anchor text of hyperlinks that are in other documents and that point to the document;
- in response to receiving a search query, which includes a search term, encoding the input into the search query and submitting the search query together with the input to a search engine;
- upon identification of the document based on the search term, retrieving portions of the document that are specified by the input, wherein the document is identified from a plurality of documents and wherein each of the portions of the document include at least one of:
  - (e) specified attributes of the document;
  - (f) specified structured data within the document;
  - (g) excerpts of text having specified features within the document; and
  - (h) text of hyperlinks that are on other documents and that point to the document;
- in response to receiving from the search engine the search-result description, using a search-result-description API to enable both viewing of the search-result description as a programmatic attribute and specifying elements of a user interface for displaying the search-result description; and
- causing display of the search-result description to an end user, wherein the search-result description is displayed in a specified format.

* * * * *